REEL-RETAINING HUB FOR TAPE TRANSPORT APPARATUS

Original Filed Nov. 29, 1963 2 Sheets-Sheet 1

INVENTORS
WALTER T. SELSTED
WILLIAM I. GIRDNER
BY Q.C. Smith

REEL-RETAINING HUB FOR TAPE TRANSPORT APPARATUS

Original Filed Nov. 29, 1963 2 Sheets-Sheet 2

INVENTORS
WALTER T. SELSTED
WILLIAM I. GIRDNER
BY A. C. Smith

United States Patent Office 3,363,855
Patented Jan. 16, 1968

3,363,855
REEL-RETAINING HUB FOR TAPE TRANSPORT APPARATUS

Walter T. Selsted, Woodside, and William I. Girdner, Portala Valley, Calif., assignors to Hewlett-Packard Company, Palo Alto, Calif., a corporation of California
Original application Nov. 29, 1963, Ser. No. 326,811, now Patent No. 3,270,935, dated Sept. 6, 1966. Divided and this application Sept. 15, 1965, Ser. No. 487,508
3 Claims. (Cl. 242—68.3)

ABSTRACT OF THE DISCLOSURE

A reel-retaining hub for tape transport apparatus includes an annular groove forming a radial flange or boss near the outer edge of the reel-centering hub and a radial shoulder into the groove axially spaced from the boss at the edge for preventing a misaligned reel from being jammed onto the reel-centering hub.

This is a divisional application of our application Ser. No. 326,811, entitled, Tape Recording and Reproducing Apparatus, filed Nov. 29, 1963, now Patent No. 3,270,935.

This invention relates to improved tape recording and reproducing apparatus.

It is an object of the present invention to provide a reel-retaining spindle for tape recording and reproducing apparatus which facilitates easy application and removal of tape reels.

Other and incidental objects of the present invention will be apparent from a reading of this specification and an inspection of the accompanying drawing in which.

Figure 1:
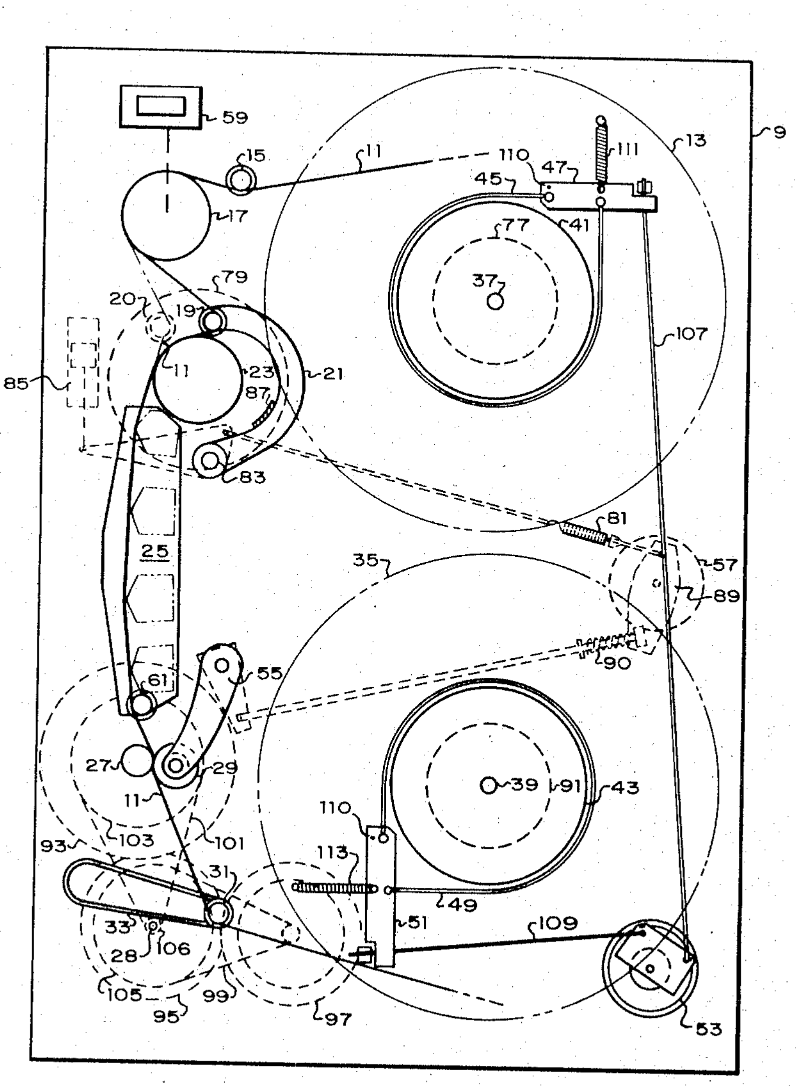
FIGURE 1 is a top view of the tape recording and reproducing apparatus showing the location of components on the base plate.
Figure 2:
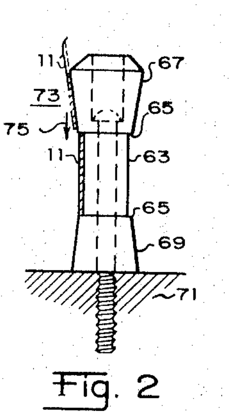
FIGURE 2 is a front view of a tape guide used in the tape recording and reproducing apparatus of the present invention.
Figure 3:
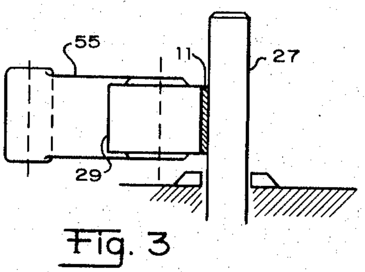
FIGURE 3 is a front view of the capstan shaft and pinch roller in operating position.
Figure 4:
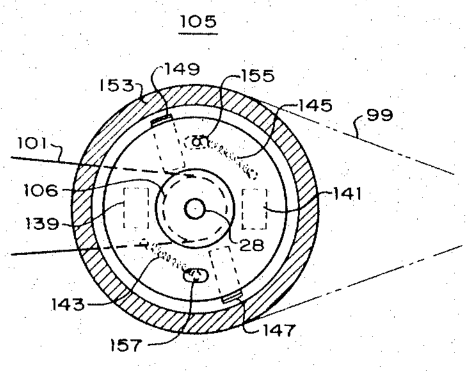
FIGURE 4 is a top view of a centrifugal clutch used in the capstan drive mechanism of the present invention.
Figure 5:
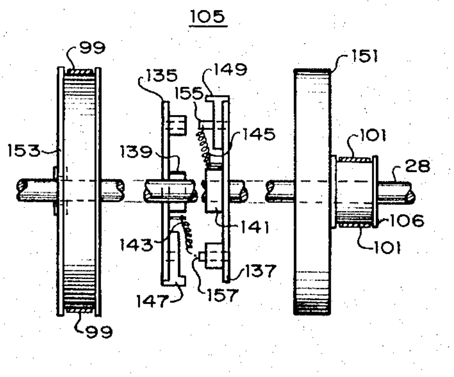
FIGURE 5 is an exploded view of the centrifugal clutch used in the capstan drive mechanism of the present invention.

Referring now to FIGURE 1, the tape recording and reproducing apparatus is shown assembled on base plate 9. The tape 11 from supply reel 13 follows a path around guide 15, roller 17, guide 19 mounted on rotatable arm 21, the flywheel roller 23 and through the assembly of signal transducer heads 25. The tape 11 is pulled through this path by the capstan drive which includes the capstan shaft 27 and pinch roller 29. The tape 11 then follows the path around guide 31 mounted on rotatable arm 33 to the take-up reel 35. The supply reel 13 is mounted on the rotatable shaft 37 of motor 77. The brakeband 45 which has both of its ends mounted on a pivotal arm 47 is disposed around substantially the entire periphery of brakedrum 41. The pivotal arm 47 is actuated by spring 111 when the hold-off solenoid 53 is de-energized. A similar brake mechanism including brakeband 49 having its both ends mounted on pivotal arm 51 and disposed around substantially the entire periphery of brakedrum 43 is provided for take-up reel 35. This brake is actuated by spring 113 when solenoid 53 is de-energized. The pinch roller 29 mounted on rotatable arm 55 and tape guide 19 mounted on rotatable arm 21 are actuated by solenoid 57. A footage counter 59 is mechanically driven from the roller 17 and thus provides an indication of the number of feet of tape 11 passing over roller 17.

Figure 6:
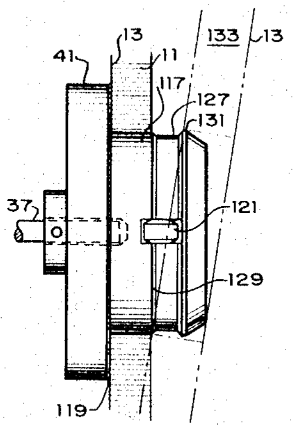
FIGURE 6 is a side view of the tape reel hold-down assembly.
Figure 7:
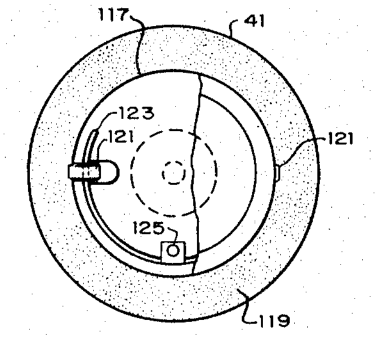
FIGURE 7 is a front view of the tape reel hold-down assembly.

The tape supply reel 13 and the take-up reel 35 are each held to the brakedrum and corresponding shaft by a hold-down spindle 115 constructed substantially as shown in FIGURES 6 and 7. This hub assembly 115 includes the brakedrum 41 and is mounted on the shaft 37 of motor 77. This hub assembly holds reel 13 on surface 117 for proper axial alignment with shaft 37 and at the same time, urges the reel 13 against a resilient surface 119. The reel-holding mechanism includes diametrically opposed rollers 121 which are spring loaded by a crescent-shaped wire spring 123 held in place by clip 125. The hub assembly includes a recessed portion or annular groove 127 which has a raised shoulder 129 at the inner end and which has a raised shoulder or boss 131 at the outer end. The width of the recessed portion or annular groove and the diameter of the raised shoulder or boss 131 are so chosen that a reel 13 placed in misalignment as shown by 133 abuts against shoulder 129 and cannot be forced onto the hub or jammed thereon in misalignment. The dimension from the inner edge of the shoulder to the diametrically opposite portion of the boss is smaller than the diameter of the central aperture of the reel. The dimension of the outer edge of the shoulder to the diametrically opposite portion of the boss is greater than the diameter of the central aperture of the reel. The reel 13 may thus be fitted on the hub assembly only when properly aligned therewith and held in position by the spring-actuated rollers 121. The force with which the reel is held against the resilient surface 119 is sufficient to impart the braking and driving torque from the hub assembly to the reel 13, 35.

We claim:

1. In a tape machine having a reel of tape which is rotatable about an axis, a hub for said reel disposed to rotate about said axis;
said hub having a body portion with a free end for receiving the central aperture of the reel in slidable engagement on said body portion; and
an annular groove in the body portion of said hub near said free end;
said groove providing a shoulder at the edge thereof remote from said free end and providing a boss at the edge thereof proximate said free end;
said boss being widely spaced from said shoulder a distance not greater than the width of the reel, and the dimension from the inner edge of said shoulder to the diametrically opposite portion of said boss being smaller than the diameter of the central aperture of the reel and the dimension from the outer edge of said shoulder to the diametrically opposite portion of said boss being greater than the diameter of the central aperture of the reel for preventing positioning of said reel over said hub in misalignment with said axis.

2. A hub as in claim 1 comprising:
a flat surface normal to said axis and disposed away from the free end of said hub to engage one side of the reel; and
an element disposed near the free end of the hub;
said element being resiliently biased radially outwardly from said axis for exerting force on the other side of said reel in a direction toward said flat surface.

3. A hub as in claim 1 wherein:
said body portion of the hub terminates at the end thereof remote from said free end in a radially outward extending flange having a planar surface normal to said axis which is disposed to engage one side of a reel; and said shoulder of the annular groove is spaced from said surface of the flange in a direction toward said free end by approximately the width of a reel.

References Cited

UNITED STATES PATENTS

| | | | |
|---|---|---|---|
| 2,614,761 | 10/1952 | Camras | 242—54.1 |
| 2,882,078 | 4/1959 | MacDonald | 242—68.3 X |
| 3,058,686 | 10/1962 | Field | 242—68.3 |
| 3,154,262 | 10/1964 | Cohen et al. | 242—68.3 |

FOREIGN PATENTS

| | | |
|---|---|---|
| 1,140,792 | 12/1962 | Germany. |

GEORGE F. MAUTZ, *Primary Examiner.*